US012100411B2

(12) United States Patent
Scheller

(10) Patent No.: US 12,100,411 B2
(45) Date of Patent: Sep. 24, 2024

(54) SNR PROFILE ADAPTIVE HEARING ASSISTANCE ATTENUATION

(71) Applicant: Starkey Laboratories, Inc., Eden Prairie, MN (US)

(72) Inventor: Thomas A. Scheller, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 235 days.

(21) Appl. No.: 17/755,242

(22) PCT Filed: Oct. 30, 2020

(86) PCT No.: PCT/US2020/070726
§ 371 (c)(1),
(2) Date: Apr. 25, 2022

(87) PCT Pub. No.: WO2021/087521
PCT Pub. Date: May 6, 2021

(65) Prior Publication Data

US 2022/0358945 A1 Nov. 10, 2022

Related U.S. Application Data

(60) Provisional application No. 62/927,805, filed on Oct. 30, 2019.

(51) Int. Cl.
*H04R 25/00* (2006.01)
*G10L 21/0216* (2013.01)
*G10L 21/0364* (2013.01)

(52) U.S. Cl.
CPC ...... *G10L 21/0216* (2013.01); *G10L 21/0364* (2013.01); *H04R 25/505* (2013.01); *H04R 25/70* (2013.01); *H04R 2225/43* (2013.01)

(58) Field of Classification Search
CPC ............ G10L 21/0216; G10L 21/0364; G10L 21/0208; H04R 25/505; H04R 25/70; H04R 2225/43
See application file for complete search history.

(56) References Cited

U.S. PATENT DOCUMENTS 7,804,973 B2 * 9/2010 De Vries ................ H04R 25/70 381/313
2004/0047474 A1 3/2004 Vries et al.

FOREIGN PATENT DOCUMENTS

WO WO-2021087521 A1 5/2021

OTHER PUBLICATIONS

"International Application Serial No. PCT/US2020/070726, International Search Report mailed Dec. 18, 2020", 4 pgs.

(Continued)

*Primary Examiner* — Brian Ensey
(74) *Attorney, Agent, or Firm* — Schwegman Lundberg Woessner, P.A.

(57) ABSTRACT

To address the technical problem of varying gain applied to different hearing impaired (HI) patients, a technical solution described herein includes application of a patient-specific noise reduction algorithm based on a patient-specific signal-to-noise ratio (SNR) loss function. HI patients vary in their ability to extract information in a given signal-to-noise ratio (SNR) environment. However, noise reduction algorithms often include a single noise reduction function for all SNR loss functions. For a HI patient with significant SNR-loss, they will receive little noise reduction in SNR conditions where the patient gains no benefit from the sound. Technical solutions described herein includes determining a HI patient's ability to extract information for various SNR values, and then using specific NR algorithm attenuation for (Continued)

specific SNR values according to the HI patient's determined ability to extract information.

14 Claims, 4 Drawing Sheets

(56) References Cited

OTHER PUBLICATIONS

"International Application Serial No. PCT/US2020/070726, Written Opinion mailed Dec. 18, 2020", 6 pgs.
Mead, Killion C, "New Thinking on Hearing in Noise: A Generalized Articulation Index", Seminars in Hearing, vol. 23, No. 1, (2002), 57-75.

* cited by examiner

SNR PROFILE ADAPTIVE HEARING ASSISTANCE ATTENUATION

CROSS-REFERENCE TO RELATED APPLICATION

This application is a U.S. National Stage Filing under 35 U.S.C. 371 from International Application No. PCT/US2020/070726, filed on Oct. 30, 2020, and published as WO 2021/087521, which claims the benefit of U.S. Provisional Application No. 62/927,805, filed Oct. 30, 2019, each of which are hereby incorporated by reference in their entirety.

TECHNICAL FIELD

Embodiments described herein generally relate to noise reduction in hearing devices.

BACKGROUND

Existing hearing assistance devices provide increased gain (e.g., amplification) of audible signals for hearing impaired patients. However, increasing the gain of an audible signal may not improve the intelligibility of the sound. It is desirable to improve hearing assistance device performance for hearing impaired patients.

DESCRIPTION OF EMBODIMENTS

Figure 1:
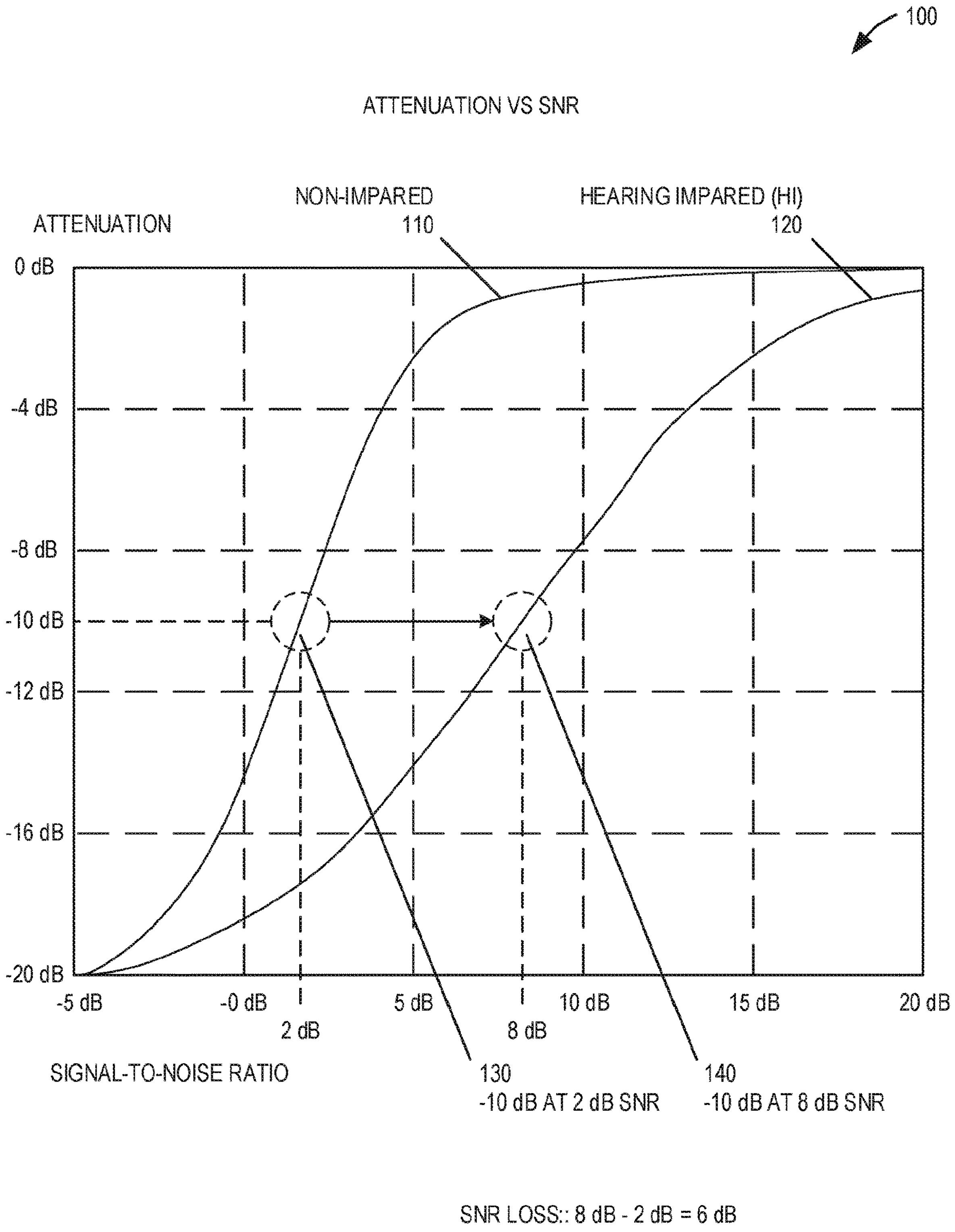
FIG. 1 is an NR attenuation graph, in accordance with at least one embodiment of the invention.

The present subject matter provides technical solutions for technical problems facing hearing assistance devices. To address the technical problem of varying gain applied to different hearing impaired (HI) patients, a technical solution described herein includes application of a patient-specific noise reduction algorithm based on a patient-specific signal-to-noise ratio (SNR) loss function. HI patients vary in their ability to extract information (i.e., ability to understand speech and other information) in a given SNR environment (i.e., SNR condition). For example, some patients can understand speech in a very noisy environment, while other patients will understand very little in that exact same environment. Each HI patient's ability to extract information may be based on the etiology (i.e., cause) or severity of their hearing loss.

Though the ability for each patient to extract information in a given SNR environment varies, noise reduction algorithms often include a single noise reduction function (e.g., noise attenuation profile) for all SNR loss functions. For a HI patient with significant SNR-loss, they will receive little noise reduction (i.e. gain reduction) in SNR conditions where the patient gains no benefit from the sound. When noise reduction (NR) is to provide comfort (e.g., noise attenuation) when no useful information can be extracted from the incoming signal, the use of NR may not be effective for or noticeable to the HI patient. Technical solutions described herein includes determining a HI patient's ability to extract information in various SNR values, and then using specific NR algorithm attenuation for specific SNR values according to the HI patient's determined ability to extract information.

HI patients may vary considerably in their respective ability to extract information. A HI patient's ability to hear a particular frequency may be measured and represented graphically as an audiogram. However, only a small part of ability to extract information is reflected in a HI patient's audiogram. For example, two people with identical audiograms can exhibit very different ability to extract information in a given environment. The audiogram is often the only diagnostic measurement used to set the hearing assistance device performance systematically, where the performance that is adjusted is the compressive amplification characteristics across input frequency and intensity based on the audiogram. However, this use of an audiogram to set hearing assistance device performance often does not reflect a particular HI patient's ability to extract information. Technical solutions described herein include using hearing data measured for a specific HI patient to improve hearing assistance device performance.

One hearing performance metric that may vary between HI patients is the SNR-loss. The SNR-loss may be characterized by an ability to extract information values corresponding to various SNR environment values. For example, normal hearing non-HI) individuals may routinely understand speech in a negative SNR environment, such as −5 dB or lower. In contrast, HI patients sometimes require +10 dB SNR environments before they are able to understand speech. The SNR-loss is often weakly correlated with the audiogram, and is often specific to the ability to extract information profile of each HI patient. A technical solution described herein includes application of a HI patient's SNR-loss to provide an improved hearing assistance device gain profile, and includes application of a HI patient's SNR-loss to provide an improved hearing assistance device NR profile.

This description of embodiments of the present subject matter refers to subject matter in the accompanying drawings, which show, by way of illustration, specific aspects and embodiments in which the present subject matter may be practiced. These embodiments are described in sufficient detail to enable those skilled in the art to practice the present subject matter. References to "an," "one," or "various" embodiments in this disclosure are not necessarily to the same embodiment, and such references contemplate more than one embodiment. The above detailed description is demonstrative and not to be taken in a limiting sense. The scope of the present subject matter is defined by the appended claims, along with the full scope of legal equivalents to which such claims are entitled.

FIG. 1 is an NR attenuation graph 100, in accordance with at least one embodiment of the invention. NR attenuation graph 100 shows example sigmoid (e.g., S-shaped) attenuation curves, including a non-impaired individual curve 110 and a HI patient curve 120. Each curve shows how the respective NR gain attenuation varies as a function of SNR values in the environment. High SNR conditions (e.g., positive SNR conditions) produce little or no gain attenuation, while negative SNR conditions produce increased or maximum gain attenuation. Each of these curves may be used to provide an NR performance to improve or maximize the comfort of an individual, such as to maximize comfort for a HI patient in situations where no meaningful information can be extracted from speech in this environment.

As can be seen in NR attenuation graph 100, the non-impaired individual curve 110 includes a non-impaired inflection point 130. The non-impaired inflection point 130 may occur at −10 dB attenuation and 2 dB SNR. However, because some HI patients require higher SNR environments for ability to extract information, the HI patient curve 120 may apply more gain reduction for similar SNR values. In particular, the HI curve 120 includes an HI inflection point 140, which may occur at −10 dB attenuation and 8 dB SNR.

The non-impaired inflection point 130 and the HI inflection point 140 may be used to characterize the sigmoid curves of the non-impaired individual curve 110 and the HI patient curve 120, respectively. As can be seen in FIG. 1, the amount of attenuation at each inflection point may vary with the maximum attenuation, such as a difference of 8 dB−2 dB=6 dB difference between the non-impaired inflection point 130 and the HI inflection point 140. The HI patient curve 120 is an example of the noise reduction performance that might be desired by a particular individual. Another individual with an identical audiogram might prefer a noise reduction performance curve that more closely matches the non-impaired individual curve 110.

The HI patient curve 120 may be generated by shifting the non-impaired individual curve 110 to the right by a measured ability to extract information of an individual HI patient, such as a dB value that is specific to the HI patient. In an example, the non-impaired inflection point 130 may be shifted rightward by 6 dB. Because each of the HI patient curve 120 and the non-impaired individual curve 110 are generally sigmoidal (i.e., S-shaped) functions, this generation of the HI patient curve 120 based on a rightward shift of the non-impaired individual curve 110 provides an improvement over a simple gain attenuation adjustment, which would merely shift the maximum attenuation (e.g. 20 dB) for the non-impaired individual curve 110 upward or downward without regard to the measured ability to extract information of an individual HI patient.

The location of the HI inflection point 140 and the shape of the HI curve 120 may be determined based on a measured ability to extract information of an individual HI patient. For example, the shape of the HI curve 120 may be generated based on a parameterization of the attenuation vs SNR curve shown in the HI patient curve 120. This parameterization may be used to shift the curve to the right or to the left. In an example, an empirical determination of how much to shift the curve may include playing a series of audible signals for a patient and iteratively determining what sounds best to the patient. In another example, a measurement-based determination of how much to shift the curve may include measuring the patient's specific SNR-loss and shift the curve by the measured amount of SNR-loss. A combination of measurement-based and empirical approaches may be used, such as providing an initial curve shift based on the measurement-based approach and fine-tuning the shift based on the empirical approach. The sigmoid shape could also be modified by changing the steepness of the curve, such as by modifying the SNR range over which the function transitions from minimum to maximum.

Figure 2:
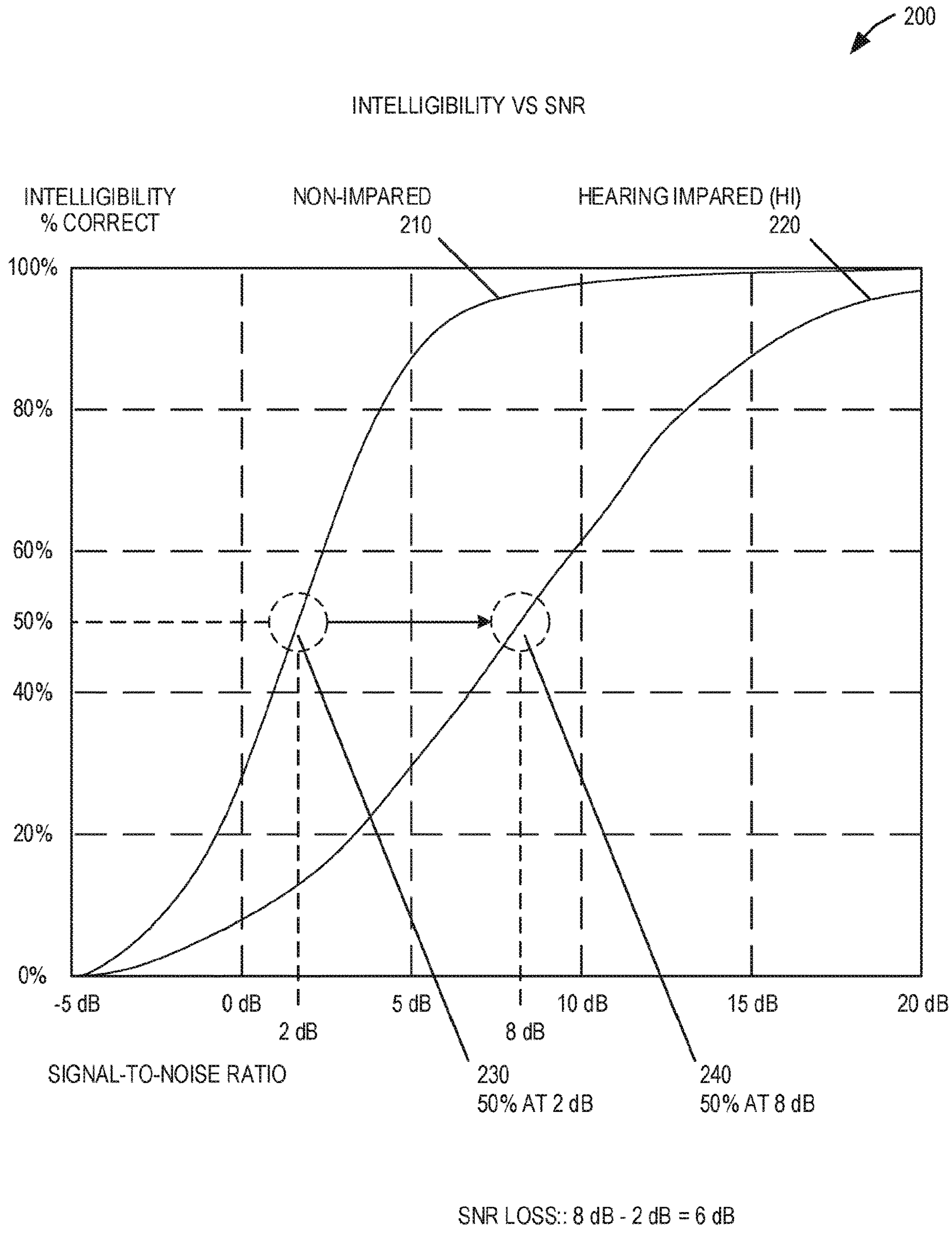
FIG. 2 is an intelligibility graph, in accordance with at least one embodiment of the invention.

FIG. 2 is an intelligibility graph 200, in accordance with at least one embodiment of the invention. Intelligibility graph 200 shows example ability to extract information curves, including a non-impaired intelligibility curve 110 and a HI intelligibility curve 120. Each curve shows how ability to extract information (e.g., percentage of audible speech that is correctly understood) varies as a function of SNR values in the environment, and may be referred to as a performance-versus intensity (PI) function. In each curve, lower SNR conditions generally correspond to decreased intelligibility, while higher SNR conditions generally correspond to increased intelligibility. In an example, each of the non-impaired intelligibility curve 110 and the HI intelligility curve 120 may be determined based on SNR-loss values determined during an ability to extract information test, such as a speech-in-noise test.

As can be seen in intelligibility graph 200, the average non-impaired individual curve 210 includes a non-impaired inflection point 230. The non-impaired inflection point 230 may occur at 2 dB SNR and 50% intelligibility. In contrast, because some HI patients require higher SNR environments for ability to extract information, the HI patient curve 120 may include an HI inflection point 140 at 8 dB SNR and 50% intelligibility. In this example, the SNR loss for 50% intelligibility may be the difference between the HI inflection point 140 and the non-impaired inflection point 230, such as 8 dB−2 dB=6 dB. The location of the HI inflection point 240 and the shape of the HI curve 220 may be determined based on a measured SNR-loss values of an individual HI patient. These measured SNR-loss values may be used in determining NR attenuation gains for the HI patient. In an example, the NR attenuation gains may be parameterized to follow the HI patient curve 120.

The application of SNR-loss for a specific HI patient may be applied to a hearing assistance device before or during a fitting for the hearing assistance device. In an example, various measurements of SNR-loss may be taken for the HI patient, and an NR curve may be generated and applied to the hearing assistance device to be provided to the HI patient. In another example, a default NR curve may be applied to a hearing assistance device, and an audiologist may use HI patient-specific SNR-loss to adjust the hearing assistance device during a fitting to provide the most effective hearing assistance for the HI patient. In another example, a default NR curve may be applied to a hearing assistance device, and the curve may be adjusted while the patient is listening to example sounds. In another example, the audiologist or the patient may be provided an NR curve tuning input (e.g., via a hearing assistance device program or smartphone application) to adjust the NR curve directly to accommodate the patient's particular SNR-loss. A combination of these techniques may be used, which may include initially applying a baseline (e.g., estimated) noise reduction curve to the hearing assistance device, and subsequently using the HI patient-specific SNR-loss to adjust the hearing assistance device during a fitting.

The application of HI patient-specific SNR-loss to parameterize or adjust an NR curve may be used to detect the use of the technical solutions described herein. For example, hearing assistance device fitting software or the hearing assistance device itself may include an SNR adjustment for an NR gain attenuation value, which may correspond to a rightward or leftward shift of the HI intelligibility curve 120 shown in FIG. 1. Similarly, the fitting software or the hearing assistance device may include the ability to enter one or more SNR-loss values specific to the HI patient, which may correspond to modifying the shape of the HI curve 120 (e.g., parameterization of NR values) specific to that HI patient.

Figure 3:
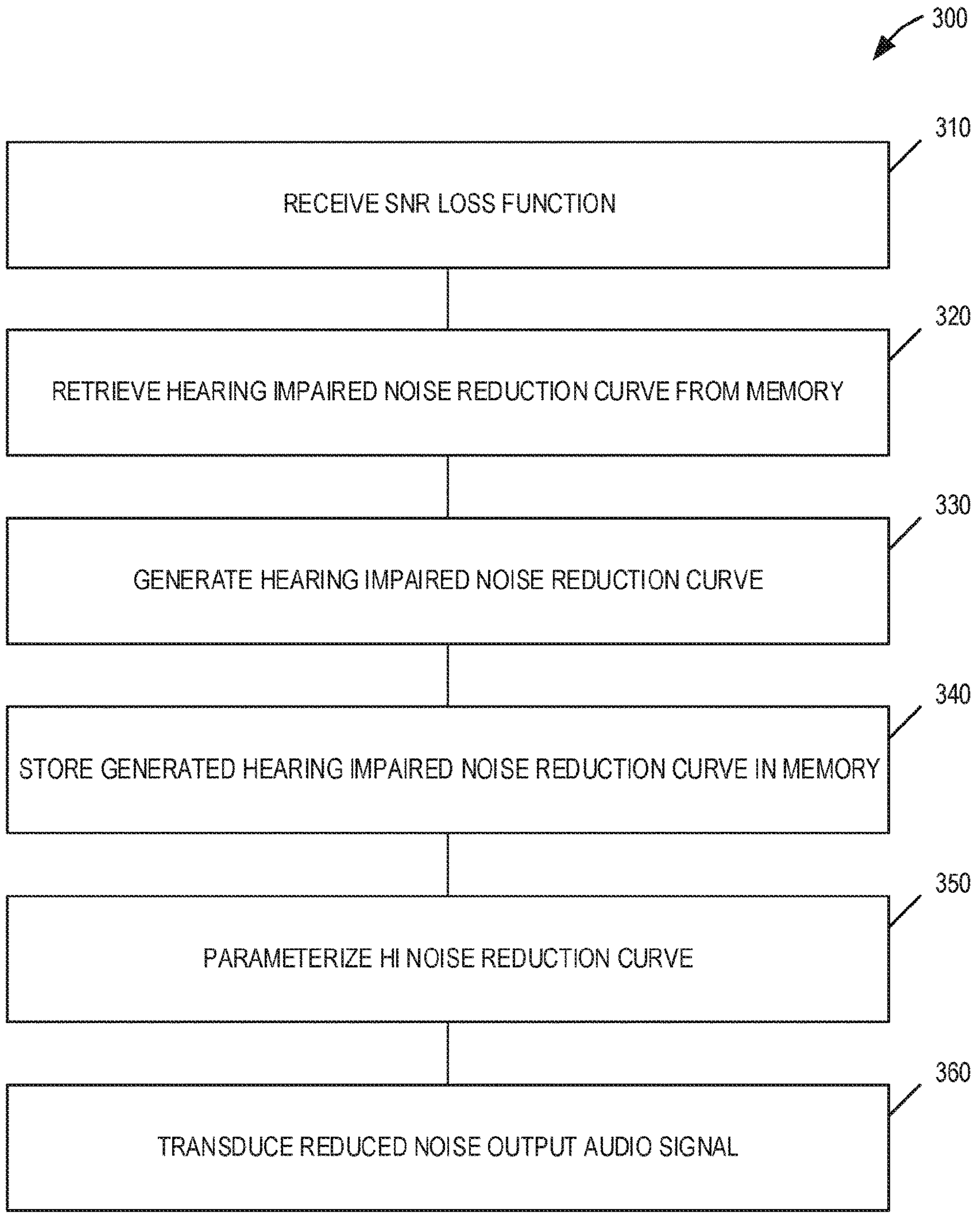
FIG. 3 is a block diagram of a noise reduction method, in accordance with at least one embodiment of the invention.

FIG. 3 is a block diagram of a noise reduction method 300, in accordance with at least one embodiment of the invention. Method 300 may include receiving 320 an SNR loss function, such as an SNR loss function specific to a hearing impaired patient. Method 300 may include retrieving 310 a hearing impaired noise reduction curve from a memory. The hearing impaired noise reduction curve may be based on SNR loss function. The noise reduction curve may have been previously generated and stored to the memory, or may be generated when needed based on the SNR loss function. Method 300 may include generating 330 the hearing impaired noise reduction curve based on the SNR loss function, and storing 340 the generated hearing impaired noise reduction curve in the memory.

Method 300 may include parameterizing 350 an HI-specific noise reduction curve. For example, the location of an HI inflection point and the shape of an HI-specific noise reduction curve may be determined based on a measured ability to extract information of an individual HI patient. The shape of the HI-specific noise reduction curve may be generated based on a parameterization of the attenuation vs SNR curve shown in the HI patient curve. This parameterization may be used to shift the curve to the right or to the left. In an example, an empirical determination of how much to shift the curve may include playing a series of audible signals for a patient and iteratively determining what sounds best to the patient. In another example, a measurement-based determination of how much to shift the curve may include measuring the patient's specific SNR-loss and shift the curve by the measured amount of SNR-loss. A combination of measurement-based and empirical approaches may be used.

Method 300 may also include transducing 360 the reduced noise output audio signal at an output audio transducer into an output audio signal for the hearing impaired patient.

Figure 4:
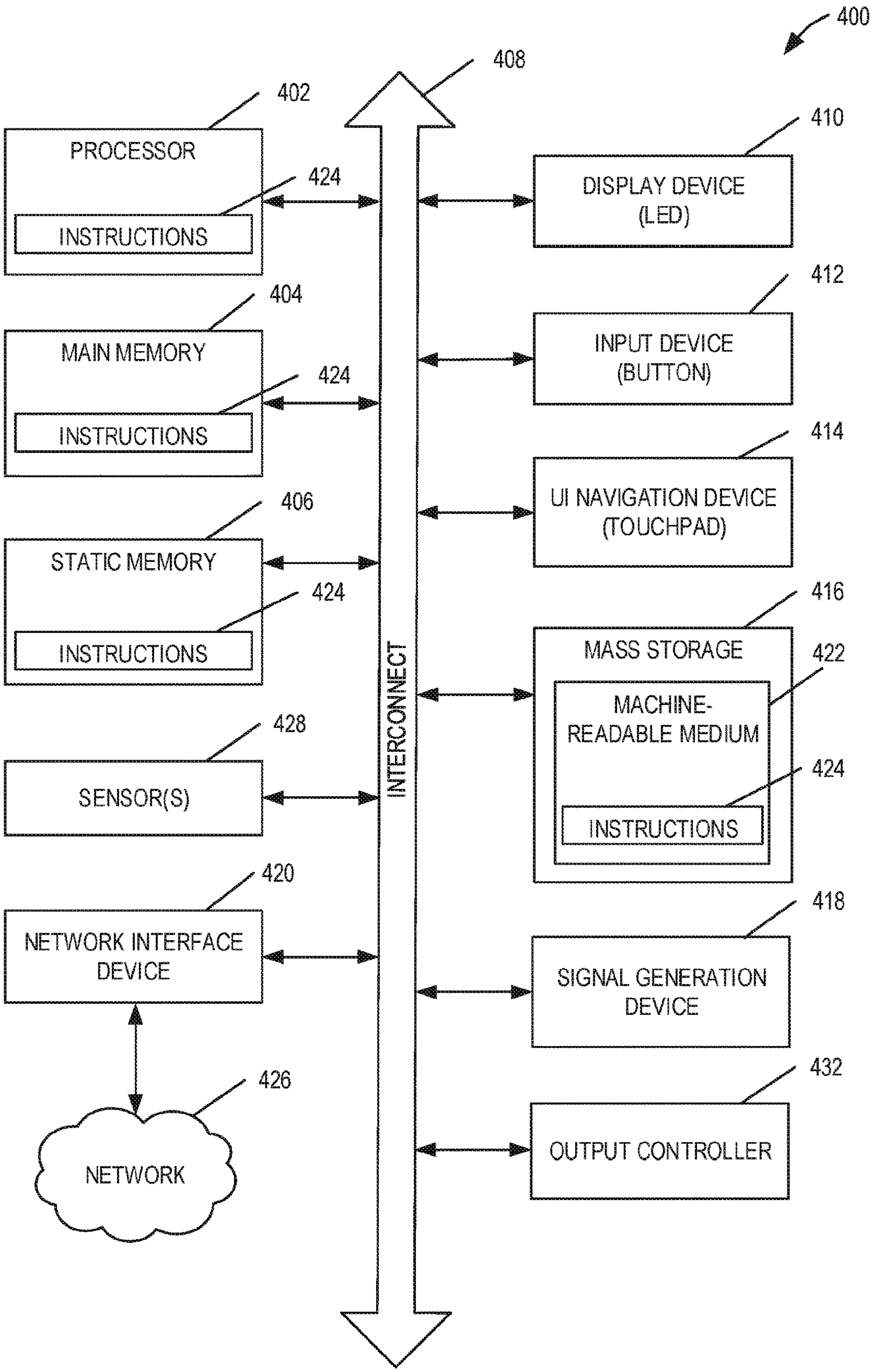
FIG. 4 illustrates a block diagram of an example machine upon which any one or more of the techniques discussed herein may perform.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the ter in "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a microphone, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software.

Various embodiments of the present subject matter may include a hearing assistance device. Hearing assistance devices typically include at least one enclosure or housing, a microphone, hearing assistance device electronics including processing electronics, and a speaker or "receiver." Hearing assistance devices may include a power source, such as a battery. In various embodiments, the battery may be rechargeable. In various embodiments multiple energy sources may be employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing aids include a processor. In digital hearing aids with a processor, programmable gains may be employed to adjust the hearing aid output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application can be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples, drawings may omit certain blocks that perform frequency synthesis, frequency analysis, analog-to-digital conversion, digital-to-analog conversion, amplification, buffering, and certain types of filtering and processing. In various embodiments the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments, different realizations of the block diagrams, circuits, and processes set forth herein can be created by one of skill in the art without departing from the scope of the present subject matter.

Various embodiments of the present subject matter support wireless communications with a hearing assistance device, such as may be used by an audiologist during a fitting. In various embodiments, the wireless communications can include standard or nonstandard communications. Some examples of standard wireless communications include, but not limited to, Bluetooth™, low energy Bluetooth, IEEE 802.11 (wireless LANs), 802.15 (WPANs), and 802.16 (WiMAX). Cellular communications may include, but not limited to, CDMA, GSM, ZigBee, and ultra-wideband (UVB) technologies. In various embodiments, the communications are radio frequency communications. In various embodiments, the communications are optical communications, such as infrared communications. In various embodiments, the communications are inductive communications. In various embodiments, the communications are ultrasound communications. Although embodiments of the present system may be demonstrated as radio communication systems, it is possible that other forms of wireless communications can be used. It is understood that past and present standards can be used. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fiber-channel, Firewire or 1394, InfiniBand, or a native streaming interface. In various embodiments, such connections include all past and present link protocols. It is also contemplated that future versions of these protocols and new protocols may be employed without departing from the scope of the present subject matter.

In various embodiments, the present subject matter is used in hearing assistance devices that are configured to communicate with mobile phones. In such embodiments, the hearing assistance device may be operable to perform one or more of the following: answer incoming calls, hang up on calls, and/or provide two-way telephone communications. In various embodiments, the present subject matter is used in hearing assistance devices configured to communicate with packet-based devices. In various embodiments, the present subject matter includes hearing assistance devices configured to communicate with streaming audio devices. In various embodiments, the present subject matter includes hearing assistance devices configured to communicate with Wi-Fi devices. In various embodiments, the present subject matter includes hearing assistance devices capable of being controlled by remote control devices.

It is further understood that different hearing assistance devices may embody the present subject matter without departing from the scope of the present disclosure. The devices depicted in the figures are intended to demonstrate the subject matter, but not necessarily in a limited, exhaustive, or exclusive sense. It is also understood that the present subject matter can be used with a device designed for use in the right ear or the left ear or both ears of the wearer. The present subject matter may be employed in hearing assistance devices, such as headsets, hearing aids, headphones, and similar hearing devices. The present subject matter may be employed in hearing assistance devices having additional sensors. Such sensors include, but are not limited to, magnetic field sensors, telecoils, temperature sensors, accelerometers, and proximity sensors.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard fitted, open fitted and/or occlusive fitted. It is understood that other hearing assistance devices not expressly stated herein may be used in conjunction with the present subject matter.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Example 1 is a noise reduction device for audio signals, the device comprising: a memory; and a processor configured to execute instructions to: receive a signal to noise (SNR) loss function specific to a hearing impaired patient; retrieve a hearing impaired noise reduction curve from the memory, the hearing impaired noise reduction curve based on the received SNR loss function; and generate a reduced noise output audio signal based on the input audio signal and the hearing impaired noise reduction curve.

In Example 2, the subject matter of Example 1 optionally includes the processor further configured to execute instructions to: generate the hearing impaired noise reduction curve based on the SNR loss function; and store the generated hearing impaired noise reduction curve in the memory.

In Example 3, the subject matter of any one or more of Examples 1-2 optionally include wherein the hearing impaired noise reduction curve is based on a positive SNR shift of a non-impaired noise reduction curve.

In Example 4, the subject matter of Example 3 optionally includes wherein a magnitude of the positive SNR shift is determined based on the SNR loss function.

In Example 5, the subject matter of any one or more of Examples 1-4 optionally include wherein the hearing impaired noise reduction curve is based on a plurality of values within a parameterized noise reduction curve.

In Example 6, the subject matter of Example 5 optionally includes wherein the plurality of values within the parameterized noise reduction curve is determined based on the SNR loss function.

In Example 7, the subject matter of any one or more of Examples 1-6 optionally include an output audio transducer to transduce the reduced noise output audio signal into an output audio signal for the hearing impaired patient.

Example 8 is a hearing assistance method for processing audio signals, the method comprising: receiving a signal to noise (SNR) loss function specific to a hearing impaired patient; retrieving a hearing impaired noise reduction curve from the memory, the hearing impaired noise reduction curve based on the received SNR loss function; and generating a reduced noise output audio signal based on the input audio signal and the hearing impaired noise reduction curve.

In Example 9, the subject matter of Example 8 optionally includes generating the hearing impaired noise reduction curve based on the SNR loss function; and storing the generated hearing impaired noise reduction curve in the memory.

In Example 10, the subject matter of any one or more of Examples 8-9 optionally include wherein the hearing impaired noise reduction curve is based on a positive SNR shift of a non-impaired noise reduction curve.

In Example 11, the subject matter of Example 10 optionally includes wherein a magnitude of the positive SNR shift is determined based on the SNR loss function.

In Example 12, the subject matter of any one or more of Examples 8-11 optionally include wherein the hearing impaired noise reduction curve is based on a plurality of values within a parameterized noise reduction curve.

In Example 13, the subject matter of Example 12 optionally includes wherein the plurality of values within the parameterized noise reduction curve is determined based on the SNR loss function.

In Example 14, the subject matter of any one or more of Examples 8-13 optionally include transducing the reduced noise output audio signal at an output audio transducer into an output audio signal for the hearing impaired patient.

In Example 15, the subject matter of any one or more of Examples 8-14 optionally include wherein generating a reduced noise output audio signal is performed by a processor within the hearing assistance device.

Example 16 is one or more machine-readable medium including instructions, which when executed by a computing system, cause the computing system to perform any of the methods of Examples 8-15.

Example 17 is an apparatus comprising means for performing any of the methods of Examples 8-15.

Example 18 is at least one non-transitory machine-readable storage medium, comprising a plurality of instructions that, responsive to being executed with processor circuitry of a computer-controlled device, cause the computer-controlled device to: receive a signal to noise (SNR) loss function specific to a hearing impaired patient; retrieve a hearing impaired noise reduction curve from the memory, the hearing impaired noise reduction curve based on the received SNR loss function; and generate a reduced noise output audio signal based on the input audio signal and the hearing impaired noise reduction curve.

In Example 19, the subject matter of Example 18 optionally includes the instructions further causing the computer-controlled device to: generate the hearing impaired noise reduction curve based on the SNR loss function; and store the generated hearing impaired noise reduction curve in the memory.

In Example 20, the subject matter of any one or more of Examples 18-19 optionally include wherein the hearing impaired noise reduction curve is based on a positive SNR shift of a non-impaired noise reduction curve.

In Example 21, the subject matter of Example 20 optionally includes wherein a magnitude of the positive SNR shift is determined based on the SNR loss function.

In Example 22, the subject matter of any one or more of Examples 18-21 optionally include wherein the hearing impaired noise reduction curve is based on a plurality of values within a parameterized noise reduction curve.

In Example 23, the subject matter of Example 22 optionally includes wherein the plurality of values within the parameterized noise reduction curve is determined based on the SNR loss function.

In Example 24, the subject matter of any one or more of Examples 18-23 optionally include transducing the reduced noise output audio signal at an output audio transducer into an output audio signal for the hearing impaired patient.

In Example 25, the subject matter of any one or more of Examples 18-24 optionally include wherein generating a reduced noise output audio signal is performed by a processor within the hearing assistance device.

Example 26 is an Active Directory Bridge apparatus for joining an external network resource to an internal network, the apparatus comprising: means for receiving a signal to noise (SNR) loss function specific to a hearing impaired patient; means for retrieving a hearing impaired noise reduction curve from the memory, the hearing impaired noise reduction curve based on the received. SNR loss function; and means for generating a reduced noise output audio signal based on the input audio signal and the hearing impaired noise reduction curve.

In Example 27, the subject matter of Example 26 optionally includes means for generating the hearing impaired noise reduction curve based on the SNR loss function; and means for storing the generated hearing impaired noise reduction curve in the memory.

In Example 28, the subject matter of any one or more of Examples 26-27 optionally include wherein the hearing impaired noise reduction curve is based on a positive SNR shift of a non-impaired noise reduction curve.

In Example 29, the subject matter of Example 28 optionally includes wherein a magnitude of the positive SNR shift is determined based on the SNR loss function.

In Example 30, the subject matter of any one or more of Examples 26-29 optionally include wherein the hearing impaired noise reduction curve is based on a plurality of values within a parameterized noise reduction curve.

In Example 31, the subject matter of Example 30 optionally includes wherein the plurality of values within the parameterized noise reduction curve is determined based on the SNR loss function.

In Example 32, the subject matter of any one or more of Examples 26-31 optionally include transducing the reduced noise output audio signal at an output audio transducer into an output audio signal for the hearing impaired patient.

In Example 33, the subject matter of any one or more of Examples 26-32 optionally include wherein generating a reduced noise output audio signal is performed by a processor within the hearing assistance device.

Example 34 is one or more non-transitory machine-readable medium including instructions, which when executed by a machine, cause the machine to perform operations of any of the operations of Examples 1-33.

Example 35 is an apparatus comprising means for performing any of the operations of Examples 1-33.

Example 36 is a system to perform the operations of any of the Examples 1-33.

Example 37 is a method to perform the operations of any of the Examples 1-33.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A noise reduction device for audio signals, the device comprising:

a memory; and a processor configured to execute instructions to:

receive a signal to noise (SNR) loss function specific to a hearing impaired patient;

retrieve a hearing impaired noise reduction curve from the memory, the hearing impaired noise reduction curve based on the received SNR loss function and a positive SNR shift of a non-impaired noise reduction curve, wherein a magnitude of the positive SNR shift is determined based on the SNR loss function; and generate a reduced noise output audio signal based on an input audio signal and the hearing impaired noise reduction curve.

2. The noise reduction device of claim 1, the processor further configured to execute instructions to:

generate the hearing impaired noise reduction curve based on the SNR loss function; and store the generated hearing impaired noise reduction curve in the memory.

3. The noise reduction device of claim 1, wherein the hearing impaired noise reduction curve is based on a plurality of values within a parameterized noise reduction curve.

4. The noise reduction device of claim 3, wherein the plurality of values within the parameterized noise reduction curve is determined based on the SNR loss function.

5. The noise reduction device of claim 1, further including an output audio transducer to transduce the reduced noise output audio signal into an output audio signal for the hearing impaired patient.

6. A hearing assistance method for processing audio signals, the method comprising:

receiving a signal to noise (SNR) loss function specific to a hearing impaired patient;

retrieving a hearing impaired noise reduction curve from a memory, the hearing impaired noise reduction curve based on the received SNR loss function and a positive SNR shift of a non-impaired noise reduction curve, wherein a magnitude of the positive SNR shift is determined based on the SNR loss function; and generating a reduced noise output audio signal based on an input audio signal and the hearing impaired noise reduction curve.

7. The hearing assistance method of claim 6, further including:

generating the hearing impaired noise reduction curve based on the SNR loss function; and storing the generated hearing impaired noise reduction curve in the memory.

8. The hearing assistance method of claim 6, wherein the hearing impaired noise reduction curve is based on a plurality of values within a parameterized noise reduction curve.

9. The hearing assistance method of claim 8, wherein the plurality of values within the parameterized noise reduction curve is determined based on the SNR loss function.

10. The method of claim 6, further transducing the reduced noise output audio signal at an output audio transducer into an output audio signal for the hearing impaired patient.

11. At least one non-transitory machine-readable storage medium, comprising a plurality of instructions that, responsive to being executed with processor circuitry of a computer-controlled device, cause the computer-controlled device to:

receive a signal to noise (SNR) loss function specific to a hearing impaired patient;

retrieve a hearing impaired noise reduction curve from a memory, the hearing impaired noise reduction curve based on the received SNR loss function and a positive SNR shift of a non-impaired noise reduction curve, wherein a magnitude of the positive SNR shift is determined based on the SNR loss function; and generate a reduced noise output audio signal based on an input audio signal and the hearing impaired noise reduction curve.

12. The non-transitory machine-readable storage medium of claim 11, the instructions further causing the computer-controlled device to:

generate the hearing impaired noise reduction curve based on the SNR loss function; and store the generated hearing impaired noise reduction curve in the memory.

13. The non-transitory machine-readable storage medium of claim 11, wherein the hearing impaired noise reduction curve is based on a plurality of values within a parameterized noise reduction curve.

14. The non-transitory machine-readable storage medium of claim 13, wherein the plurality of values within the parameterized noise reduction curve is determined based on the SNR loss function.

* * * * *